(12) United States Patent
Johansson et al.

(10) Patent No.: US 11,113,779 B2
(45) Date of Patent: Sep. 7, 2021

(54) DIGITAL WATERMARKING LEVERAGING ANOMALOUS MESH ELEMENTS

(71) Applicant: Microsoft Technology Licensing, LLC, Redmond, WA (US)

(72) Inventors: Erik Gustaf Anders Johansson, Linköping (SE); Hans-Ulrik Tord Lindahl, Linköping (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 399 days.

(21) Appl. No.: 16/043,199

(22) Filed: Jul. 24, 2018

(65) Prior Publication Data

US 2020/0034944 A1   Jan. 30, 2020

(51) Int. Cl.
*H04L 9/32* (2006.01)
*G06T 1/00* (2006.01)
*G06T 17/20* (2006.01)

(52) U.S. Cl.
CPC ............ *G06T 1/0021* (2013.01); *G06T 17/20* (2013.01); *G06T 2201/0051* (2013.01); *G06T 2201/0065* (2013.01)

(58) Field of Classification Search
CPC .................. G06T 1/0021; G06T 17/20; G06T 2201/0051; G06T 2201/0065; G06T 1/0028
See application file for complete search history.

(56) References Cited

U.S. PATENT DOCUMENTS

| 6,111,584 A | 8/2000 | Murphy |
| 2010/0082248 A1 | 4/2010 | Dorum et al. |
| 2011/0286624 A1* | 11/2011 | Choi ...................... G06T 15/00 382/100 |
| 2013/0120369 A1* | 5/2013 | Miller ................. G06F 21/6227 345/419 |
| 2014/0085302 A1 | 3/2014 | Doyle et al. |
| 2014/0376767 A1 | 12/2014 | Powers et al. |
| 2015/0005919 A1 | 1/2015 | McGatha et al. |

(Continued)

OTHER PUBLICATIONS

Kai Wang, Guillaume Lavoué, Florence Denis, and Atilla Baskurt, Hierarchical Watermarking of Semiregular Meshes Based on Wavelet Transform, IEEE Transactions on Information Forensics and Security, vol. 3, No. 4, Dec. 2008 (Year: 2008).*

(Continued)

*Primary Examiner* — Amie C. Lin

(57) ABSTRACT

A technique is described herein for adding a digital watermark to a mesh. The mesh describes a three-dimensional object using a plurality of vertices and edges, which together define a plurality of polygonal shapes (e.g., triangles). The technique involves identifying at least one anomalous element of the mesh. The technique then supplements one or more of the anomalous elements by adding a computer-readable code to the anomalous element(s). That computer-readable code includes a digital watermark. An anomalous element corresponds to a part of the mesh that qualifies as a statistically atypical occurrence within the mesh, based on a specified rule that defines what constitutes a statistically atypical occurrence. In a reading stage, the technique finds the anomalous element(s). It then reads the digital watermark that has been encoded into the anomalous element(s).

18 Claims, 11 Drawing Sheets

(56) References Cited

U.S. PATENT DOCUMENTS

| | | |
|---|---|---|
| 2016/0245657 A1 | 8/2016 | Dorum |
| 2018/0082464 A1 | 3/2018 | Akenine-Moller et al. |
| 2018/0136633 A1 | 5/2018 | Small et al. |
| 2020/0175641 A9* | 6/2020 | Kurin .................. H04N 1/3232 |

OTHER PUBLICATIONS

Emil Praun, Hugues Hoppe, Adam Finkelstein, Robust MeshWatermarking, ACM SIGGRAPH 99 Conference Proceedings, 1999 (Year: 1999).*
Denis Zorin, Peter Schroder, Course notes: Subdivision for Modeling and Animation, SIGGRAPH 99, 1999 (Year: 1999).*
Guillaume Lavoue, Florence Denis, Florent Dupont, Subdivision surface watermarking, Computers & Graphics vol. 31, pp. 480-492, Elsevier Ltd. 2007 (Year: 2007).*
Medimegh, et al., "A Survey of the 3D Triangular Mesh Watermarking Techniques," in International Journal of Multimedia, vol. 1.1, Jul. 2015, 8 pages.
El-Seoud, et al., "Robust Digital Watermarking for Compressed 3D Models Based on Polygonal Representation," in International Journal of Computer Applications, vol. 61, No. 4, Jan. 2013, 13 pages.
International Search Report and Written Opinion issued in PCT Application No. PCT/US2019/039488, dated Oct. 9, 2019, 30 pages.
Wang, et al., "A Comprehensive Survey on Three-Dimensional Mesh Watermarking," in Journal of IEEE Transactions on Multimedia, vol. 10, No. 8, Dec. 2008, pp. 1513-1527.

* cited by examiner

OVERVIEW OF THE WATERMARK CREATING OPERATION
1002

PROVIDE A FILE HAVING A DATA STRUCTURE THAT EXPRESSES AN ORIGINAL MESH, THE ORIGINAL MESH DESCRIBING A THREE-DIMENSIONAL OBJECT, THE ORIGINAL MESH HAVING: A PLURALITY OF VERTICES THAT HAVE RESPECTIVE LOCATIONS IN THE ORIGINAL MESH; A PLURALITY OF EDGES THAT CONNECT THE VERTICES TOGETHER; AND A PLURALITY OF POLYGONAL SHAPES DEFINED BY THE VERTICES AND THE EDGES.
1004

SEARCH THE DATA STRUCTURE FOR AT LEAST ONE ANOMALOUS ELEMENT OF THE ORIGINAL MESH THAT QUALIFIES AS A STATISTICALLY ATYPICAL OCCURRENCE WITHIN THE ORIGINAL MESH, BASED ON A PREDETERMINED RULE THAT DEFINES WHAT CONSTITUTES A STATISTICALLY ATYPICAL OCCURRENCE.
1006

MODIFY ONE OR MORE ANOMALOUS ELEMENTS THAT ARE IDENTIFIED SO THAT THE ONE OR MORE ANOMALOUS ELEMENTS COLLECTIVELY EXPRESS A COMPUTER-READABLE CODE INCLUDING A DIGITAL WATERMARK, THE MODIFYING OPERATION PRODUCING A MODIFIED MESH FILE.
1008

STORE THE MODIFIED MESH FILE ON A COMPUTER-READABLE MEDIUM. THE COMPUTER-READABLE CODE IS EXTRACTABLE BY ANY OF A SET OF CONSUMING APPLICATIONS THAT USE DIFFERENT RESPECTIVE NATIVE FILE FORMATS.
1010

FIG. 10

OVERVIEW OF OPERATION OF THE WATERMARK READING OPERATION
1202

RECEIVE A FILE HAVING A DATA STRUCTURE THAT EXPRESSES A MODIFIED MESH, THE MODIFIED MESH DESCRIBING A THREE-DIMENSIONAL OBJECT, THE MODIFIED MESH HAVING: A PLURALITY OF VERTICES THAT HAVE RESPECTIVE LOCATIONS IN THE ORIGINAL MESH; A PLURALITY OF EDGES THAT CONNECT THE VERTICES TOGETHER; A PLURALITY OF POLYGONAL SHAPES DEFINED BY THE VERTICES AND THE EDGES; AND A COMPUTER-READABLE CODE THAT INCLUDES A DIGITAL WATERMARK.
1204

SEARCH THE DATA STRUCTURE FOR AT LEAST ONE ANOMALOUS ELEMENT OF THE MODIFIED MESH THAT QUALIFIES AS A STATISTICALLY ATYPICAL OCCURRENCE WITHIN THE MODIFIED MESH, BASED ON A PREDETERMINED RULE THAT DEFINES WHAT CONSTITUTES A STATISTICALLY ATYPICAL OCCURRENCE.
1206

READ THE MACHINE-READABLE CODE FROM THE ANOMALOUS ELEMENT(S) THAT ARE IDENTIFIED BY THE SEARCHING OPERATION.
1208

OPTIONALLY VERIFY THE INTEGRITY OF THE DIGITAL WATERMARK THAT IS READ BASED ON ERROR-CHECKING INFORMATION CONTAINED IN THE COMPUTER-READABLE CODE.
1210

PROCESS THE DIGITAL WATERMARK IN THE COMPUTER-READABLE CODE.
1212

FIG. 12

DIGITAL WATERMARKING LEVERAGING ANOMALOUS MESH ELEMENTS

BACKGROUND

Digital watermarks refer to information items added to digital content. A system may rely on digital watermarks for various purposes, such as to verify the authenticity of the digital content, manage the consumption of the digital content, etc.

A growing number of applications provide the ability to interact with meshes that describe three-dimensional objects. For example, the meshes may correspond to computer-aided design files, medical images, depth images produced by mixed-reality devices, etc. The application of digital watermarks to meshes is challenging in view of the complexity of information associated with the meshes, the diversity of applications that may interact with the meshes, the variety of ways in which the applications may manipulate the meshes, and so on.

SUMMARY

A technique is described herein for adding a digital watermark to a mesh. The mesh describes a three-dimensional object using a plurality of vertices and edges, which together define a plurality of polygonal shapes (e.g., triangles). The technique involves identifying at least one anomalous element of the mesh. The technique then supplements one or more of the anomalous elements by adding a computer-readable code to the anomalous element(s). That computer-readable code includes a digital watermark. By virtue of the use of one or more anomalous elements, the technique can quickly and efficiently locate these anomalous element(s), both in the process of creating the digital watermark and in the subsequent process of reading the digital watermark.

Generally, an anomalous element corresponds to a part of the mesh that qualifies as a statistically atypical occurrence within the mesh, based on a specified rule that defines what constitutes an atypical occurrence. Without limitation, for instance, an anomalous element may include a vertex in the mesh that is connected to at least a prescribed number n of other vertices. For instance, assume that, for most of the vertices in the mesh, each such vertex is connected to six other vertices. In this context, the technique may find one or more high-valence vertices, each of which is connected to at least ten other vertices. Each such high-valence vertex, along with its connected vertices and associated edges, collectively constitutes an anomalous element (because there should be a relatively small number of these elements in the mesh).

According to another illustrative aspect, the technique modifies an anomalous element by subdividing the anomalous element, that is, by adding new edges and new vertices to the anomalous element. In one implementation, the location of each new vertex along an existing edge encodes a value in the computer-readable code.

According to another illustrative aspect, the technique reads a digital watermark from a mesh by finding the anomalous element(s) that have been modified in the manner described above. The technique then reads the digital watermark from the anomalous element(s), e.g., by scanning the edges of the anomalous element(s) in a prescribed order.

According to one technical characteristic, a digital watermark that the technique produces constitutes an integral part of the mesh itself, rather than supplemental metadata that is appended to the mesh and stored separately from the mesh. By virtue of this characteristic, the digital watermark can be successfully read by different applications that use different respective file formats.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 10 is a flowchart that shows one illustrative process for creating a digital watermark.

FIG. 12 is a flowchart that shows one illustrative process for reading a digital watermark.

Figure 1:
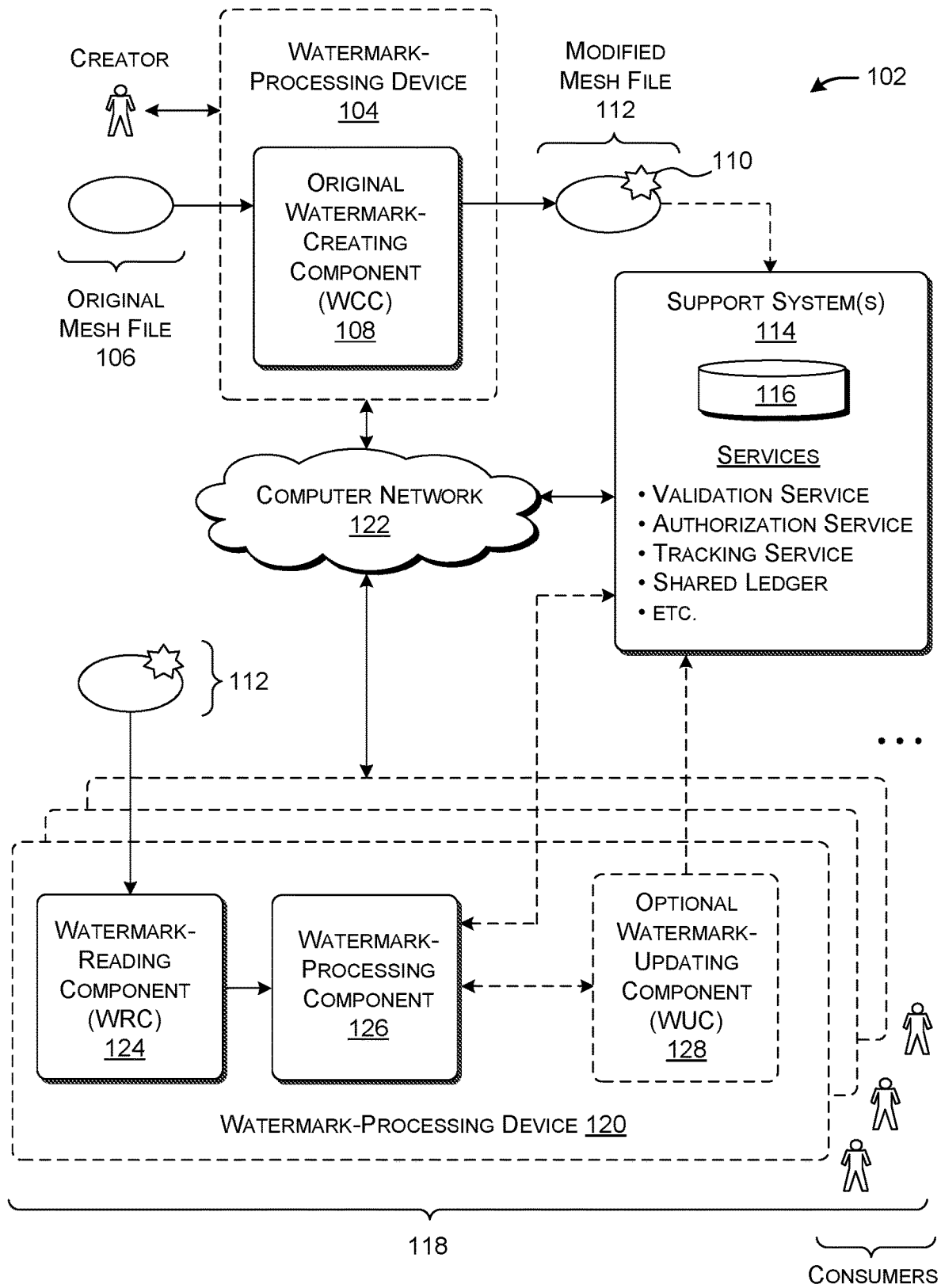
FIG. 1 shows an illustrative computing environment for creating and reading digital watermarks. The digital watermarks annotate a mesh that describes a three-dimensional object.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for creating and reading a digital watermark. Section B sets forth illustrative methods which explain the operation of the computing environment of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry.

The term "component" refers to a part of the hardware logic circuitry that performs a particular function. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

FIG. 1 shows a computing environment 102 for creating and consuming digital watermarks associated with meshes. As used herein, a digital watermark corresponds to digital information added to digital content that identifies an entity (or entities) associated with the digital content, and/or some other characteristic(s) associated with the digital content. The entity(ies) may correspond to a user or organization that created the digital content, a user or organization that most recently modified the digital content, an owner of the digital content, and so on, or any combination thereof.

A mesh corresponds to a data structure that describes a three-dimensional object using a collection of vertices and edges. The vertices and edges, in turn, define a plurality of polygonal shapes (primitives). In the examples presented herein, the polygonal shapes correspond to triangles, each defined by three vertices and three edges; but the techniques described herein are applicable to meshes that use other types of geometric primitives. As the term as used herein, a three-dimensional object may represent any content having any scope. For instance, an object may represent an individual physical or fanciful object, such as a part of an automobile or a character in a game. Or an object may represent a collection of objects, such as a portion of an entire scene. Further note that what is referred to as a three-dimensional object is intended to encompass objects described in three or more dimensions. That is, a three-dimensional object, as that term is used herein, is not limited to objects that are described using only three dimensions. For instance, a data structure may describe an object using three spatial dimensions together with time.

A mesh may originate from any source or combination of sources. For instance, a mesh may originate from an artist or engineer who manually creates the mesh using a graphics application of any type. For example, a mesh in that context may represent a computer-aided design (CAD) file. Alternatively, or in addition, a mesh may originate from a depth camera system coupled to a mixed reality device of any type, a robotic vehicle, a drone, etc. For example, a mesh in that context may represent a portion of a physical scene with which a user interacts using a head-mounted display. Alternatively, or in addition, a mesh may originate from a medical scanning device, a product scanning device (e.g., a Lidar device), etc. Alternatively, or in addition, a mesh may originate from a scene fusion system which programmatically composes a three-dimensional scene from multiple images that depict the scene from different respective perspectives. The above examples of meshes are cited by way of illustration, not limitation; a mesh can originate from yet other sources.

The computing environment 102 includes a first watermark-processing device 104 which creates a digital watermark, which it integrates with an original mesh file 106. The watermark-processing device 104 may correspond to any kind of computing device (or devices), examples of which are described below in Section C. The watermark-processing device 104 uses a watermark-creating component (WCC) 108 to create a computer-readable code 110 which includes the digital watermark as part thereof. Overall, the watermark-creating component 108 produces a modified mesh file 112 which includes the computer-readable code 110. Additional information regarding the operation of the watermark-creating component 108 appears below.

A support system (or systems) 114 can include a data store 116 which stores a record of digital watermarks that have been created. That data store 116 can also map each digital watermark to various metadata pertaining to the digital watermark, including, without limitation: the identity of the modified mesh file 112; the source of the modified mesh file 112; the owner of the modified mesh file 112; the time at which the digital watermark was created; the permissions associated with the modified mesh file 112, and so on.

The digital watermark itself can include any information. For example, the digital watermark may correspond to an arbitrarily selected key which points to an entry in the data store 116. Alternatively, or in addition, the digital watermark may correspond to a hash (e.g., a cryptographic hash) of the original mesh file 106. Alternatively, or in addition, the digital watermark can embed metadata that directly describes one or more attributes associated with the modified mesh file 112, such as the owner of the modified mesh file 112, the permissions associated with the modified mesh file 112, and so on.

The support system(s) 114 can optionally include one or more services, including, but not limited to: a validation service; an authorization service; a tracking system; a shared ledger, etc. The validation service provides, in response to an inquiry from a consumer, a response that indicates whether the modified mesh file 112 with which the consumer is interacting is a valid mesh file (which the validation service can determine by comparing a code submitted by the consumer with a data store of previously stored valid codes). The authorization service provides, in response to an inquiry from a consumer, a response that indicates whether the consumer is authorized to interact with the modified mesh file 112 (which the authorization service can determine by using a code submitted by the consumer to access authorization information previously stored in a data store). The tracking service records, in response to a notification from the consumer, information in a tracking data store that indicates that the consumer has accessed the modified mesh file 112. The shared ledger records, in response to a notification from the consumer, information regarding any changes that the consumer has made to the modified mesh file 112 (which may include changes made to the digital watermark associated with the modified mesh file 112). For instance, the shared ledger may use block chain technology to maintain the shared ledger. The above-identified services are described by way of illustration, not limitation; the support system(s) 114 can include yet other types of services that rely on the use of digital watermarks.

FIG. 1 also shows that that the computing environment 102 can include any number of watermark-processing devices 118 for consuming the modified mesh file 112, such as the representative watermark-processing device 120. Each such water-processing device may correspond to any type of computing device, examples of which are described in Section C.

A computer network 122 communicatively couples all of the devices (104, 118) shown in FIG. 1 together. The computer network 122 may correspond to a wide area network (e.g., the Internet), a local area network, etc., or any combination thereof.

The support system(s) 114 may correspond to one or more computing devices that are remote with respect to any consumer of the modified mesh file 112. For example, the support system(s) 114 may correspond to one or more server-implemented systems accessible to consumers (and creators of watermarks) via the computer network 122. Alternatively, or in addition, any part(s) of the support system(s) 114 may correspond to functionality provided by any watermark-processing device(s) (104, 118) in the computing environment 102. For instance, the computing environment 102 can represent a peer-to-peer system of watermark-processing devices which create and consume modified mesh files, without the assistance of any centrally maintained services. Similarly, the shared ledger (if used) may correspond to a single data record provided at a single site, or a distributed ledger provided by a plurality of different computing devices.

The representative watermark-processing device 120 can receive the modified mesh file 112 from any source or sources, using any access protocol (e.g., push-based, pull-based, etc.). For example, the watermark-processing device 120 can retrieve the modified mesh file 112 directly from the watermark-processing device 104 which created it, via the computer network 122. Or the watermark-processing device 120 can retrieve the modified mesh file 112 from an online marketplace of mesh files, via the computer network 122, etc.

A watermark-reading component (WRC) 124 reads the computer-readable code provided by the modified mesh file 112 using the illustrated techniques described below. A watermark-processing component 126 performs one or more actions based on the digital watermark extracted from the computer-readable code that has been read. Such actions can include interacting with the support system(s) 114 to validate the modified mesh file 112, determine access rights associated with the modified mesh file 112, determine other information associated with the modified mesh file 112, report the fact that the modified mesh file 112 has been accessed, and so on. Alternatively, or in addition, the watermark-processing component 126 can extract metadata from the digital watermark itself, without interacting with the support system(s) 114.

An optional watermark-updating component (WUC) 128 allows a consumer to modify the modified mesh file 112 (if so permitted by the consumer's access rights). The WUC 128 can also update the computer-readable code (and its associated digital watermark) to memorialize the changes that have been made to the mesh file.

For instance, the WUC 128 can create a new cryptographic hash of the newly modified mesh file 112, to produce a new digital watermark. The WUC 128 can then report the new digital watermark to the shared ledger provided by the support system(s) 114. The shared ledger provides a linked list of changes that have been made to the modified mesh file 112 since the initial creation of the modified mesh file 112 by the watermark-creating component 108. The shared ledger may maintain the linked list in encrypted form using block chain technology.

Figure 2:
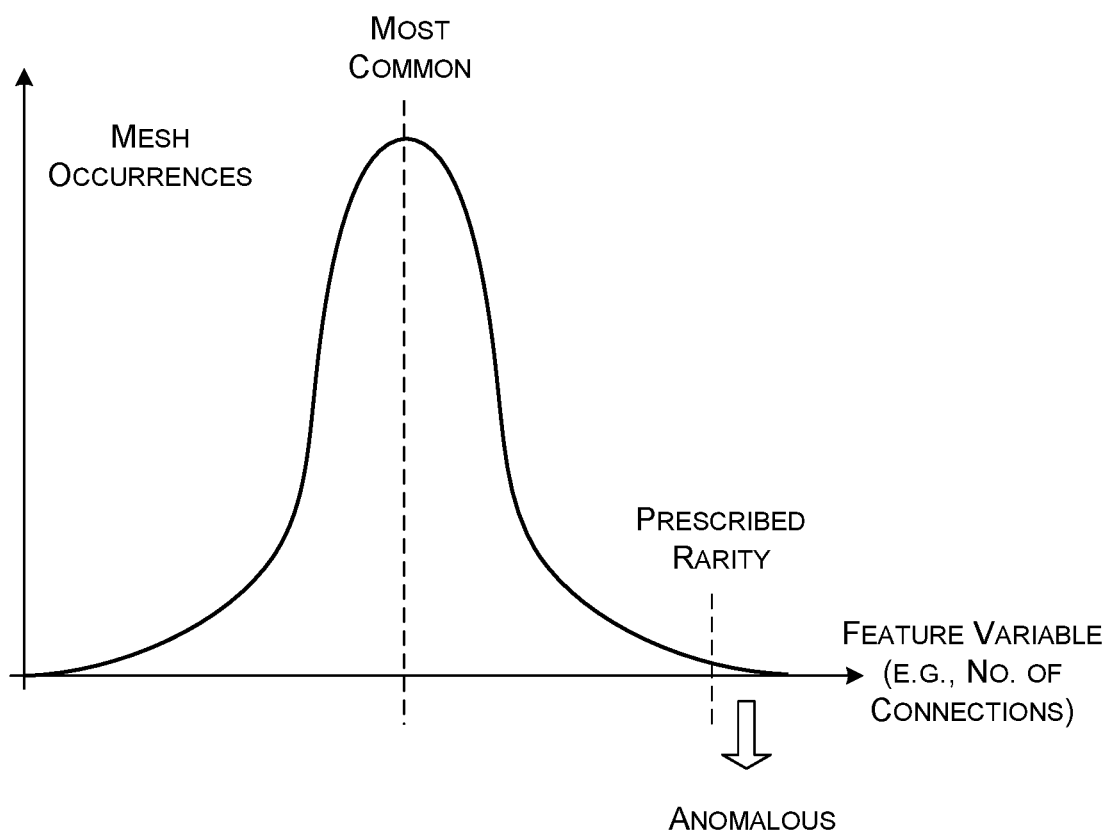
FIG. 2 is a graph used to convey a general characteristic regarding the operation of the computing environment of FIG. 1.

FIG. 2 is a graph used to convey a general property regarding the operation of the computing environment 102 of FIG. 1. The graph describes a distribution of occurrences of an identified feature in the original mesh file 106, with respect to a range of values associated with a feature variable. For example, assume that the feature corresponds to a star pattern in the mesh; that pattern includes a vertex under consideration together with a plurality of edges connected to that vertex. The vertex which defines the center hub of this pattern is referred to herein as a center vertex $v_c$, but note that any vertex qualifies as a center vertex when it is considered as a center with respect to other vertices. Each edge associated with a center vertex $v_c$ is connected, at its other end, to a neighboring vertex. One variable associated with this pattern identifies the number of the edges associated with the center vertex $v_c$, also referred to herein as the center vertex's valence. In this illustrative context, the graph plots the distribution of occurrences of vertices in the original mesh file 106 for different valences, e.g., by identifying the number of center vertices that are connected to four neighboring vertices, the number of center vertices that are connected to five neighboring vertices, the number of center vertices that are connected to six neighboring vertices, and so on.

The peak of the distribution specifies the most common valence associated with the original mesh file 106. For instance, in one non-limiting environment, assume that the great majority of center vertices in the original mesh file 106 are connected to six neighboring vertices, and therefore have six "spoke edges" emanating from the center vertex. The distribution also reveals that a relatively small number of center vertices are respectively connected to a high number of neighboring vertices (relative to the norm of six neighboring vertices). For example, the distribution may reveal that only a small percentage of center vertices in the original mesh file 106 are connected to ten neighboring vertices. This description refers to any center vertex that is connected to a relatively high number of neighboring vertices as a high-valence vertex, where "high" is defined with respect to an environment-specific threshold value.

A high-valence vertex, together with its cluster of neighboring vertices and edges, may be considered an anomalous element of the original mesh file 106. It is anomalous because it can be statistically expected to appear relatively infrequently. More formally, the technique described herein defines an anomalous element with respect to a stored rule. The rule identifies the criteria by which an element of the original mesh file 106 may be considered anomalous, such as by specifying that any center vertex that is connected to ten or more neighboring vertices is part of an anomalous element of the original mesh file 106.

The technique described herein can use any other characteristic(s) associated with the original mesh file 106 to define anomalous elements. For example, in another case, the technique can define what constitutes an anomalous element with reference to the shape of triangles in the original mesh file 106. In another case, the technique can define what constitutes an anomalous element with reference to a combination of features in the original mesh file 106. For instance, presume that it is rare to find a six-valence vertex connected to two eight-valence vertices. If so, the technique can define this combination of three linked vertices as part of a single anomalous element.

In the technique described herein, the WCC 108 first finds a prescribed number of anomalous elements in the original mesh file 106. For example, the WCC 108 can find one or more ten-or-greater-valence vertices, each of which constitutes the center vertex $v_c$ of a qualifying anomalous element. The WCC 108 then modifies the set of anomalous elements so that these element(s) collectively express the computer-readable code. In the reading process, the WRC 124 finds the anomalous element(s) that have been modified in the above-described manner. The WRC 124 then reads the computer-readable code that has been embedded into the anomalous element(s).

By virtue of the use of anomalous elements to embed computer-readable codes, the techniques described herein can efficiently encode digital information into the original mesh file 106, and then efficiently access it once it is created. More specifically, by using the anomalous elements, the techniques provides a way of unambiguously identifying the part of a mesh file to which a computer-readable code can be added, or from which the computer-readable code may be read. This, in turn, allows the techniques to quickly access a desired part of the mesh file under consideration. In the reading process, the techniques also reduce the risk of accessing an incorrect element. An incorrect element corresponds to any element that does not contribute to expressing the computer-readable code, but is mistaken for such.

To facilitate description, the remainder of this explanation emphasizes the case in which an anomalous element is defined as a part of a mesh file that includes a high-valence center vertex $v_c$, such as a center vertex $v_c$ connected to at least ten neighboring vertices. But the same principles described below can be extended to other types of anomalous elements defined with respect to geometric primitives of any shape.

Figure 3:
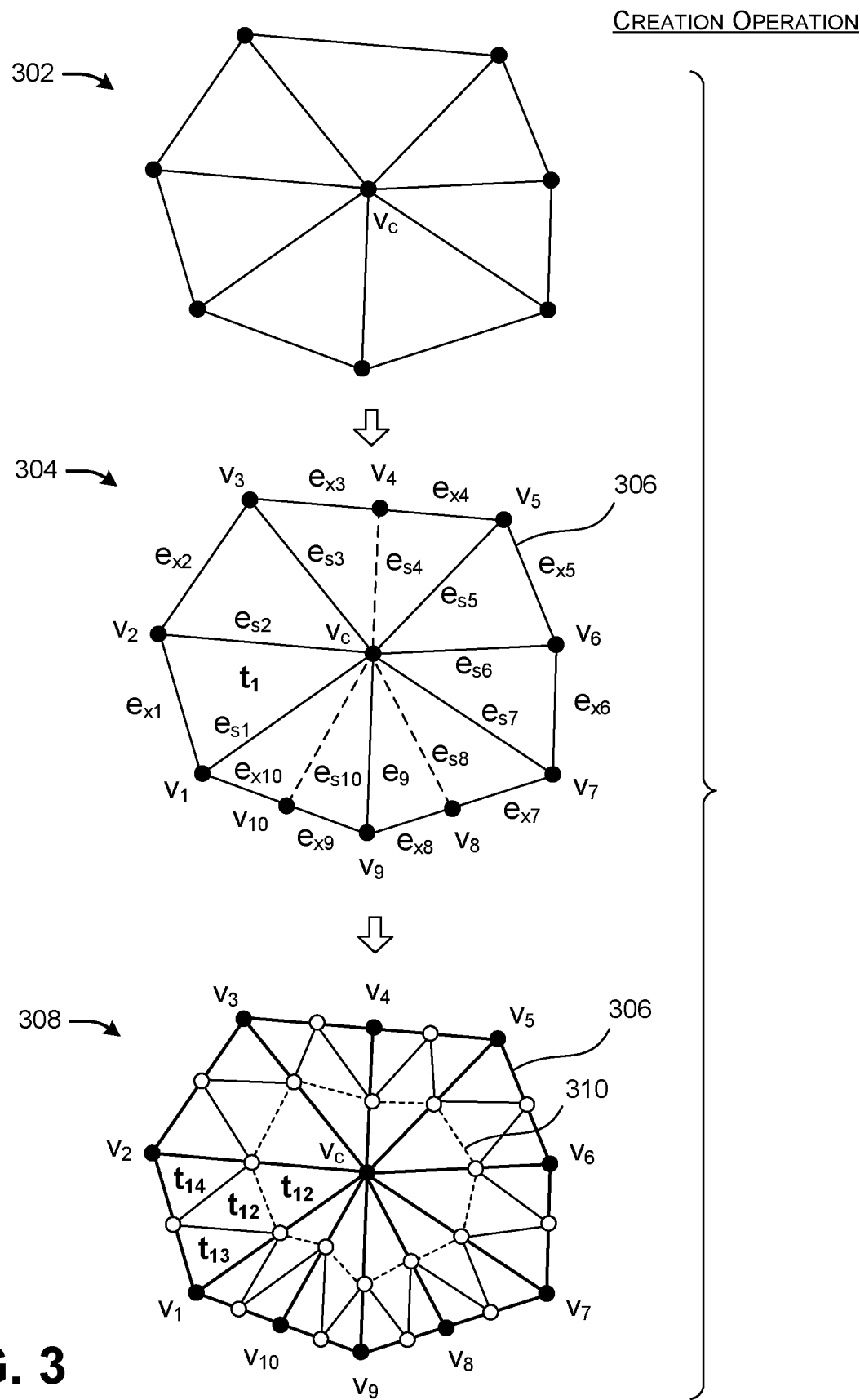
FIGS. 3 and 4 together show a non-limiting example how the computing environment of FIG. 1 can create a digital watermark.

FIG. 3 shows an overview of one technique by which the watermark-creating component (WCC) 108 can create the modified mesh file 112, including the computer-readable code 110. In a first stage 302, assume that the WCC 108 attempts to find at least one anomalous element that includes a ten-or-greater-valence center vertex $v_c$. But assume that the WCC 108 cannot find any naturally occurring ten-or-greater-valence vertices. In one implementation, the WCC 108 addresses this issue by finding the highest-valence vertex, and then modifying it such that it becomes a ten-valence vertex. For example, assume that the WCC 108 finds a set of seven-valence vertices. The WCC 108 arbitrarily picks one of the seven-valence vertices and then modifies it such that it becomes a ten-valence vertex.

A second stage 304 shows the outcome of the process by which the WCC 108 transforms a seven-valence vertex into a ten-valence vertex. That is, assume that the center vertex $v_c$ originally includes seven edges which extend out to respective neighboring vertices. The edges connecting the neighboring vertices collectively define an outer ring 306 around the center vertex $v_c$. The WCC 108 increases the valence of the center vertex $v_v$ by drawing three new edges ($e_{s4}$, $e_{s8}$, and $e_{s10}$), each of which emanates from the center vertex $v_c$ and terminates in a newly added neighboring vertex placed on the outer ring 306.

Taken all together, the anomalous element thus created includes the center vertex $v_c$, ten neighboring vertices ($v_1$-$v_{10}$), ten spoke edges ($e_{s1}$-$e_{s10}$) which connect the center vertex $v_c$ to the respective neighboring vertices ($v_1$-$v_{10}$), and ten outer ring edges ($e_{x1}$-$e_{x10}$) which collectively define the outer ring 306. Finally, note that the anomalous element includes ten triangles, including the representative triangle $t_1$ defined by the vertices $v_c$, $v_1$, and $v_2$, and the edges $e_{s1}$, $e_{x1}$, and $e_{s2}$.

In a third stage 308, the WCC 108 modifies the anomalous element so that it expresses a computer-readable code, which may be part of a more encompassing computer-readable code. The WCC 108 performs this task by subdividing each triangle into four component triangles. It performs this task, in turn, by adding new vertices to the edges of the anomalous element. (FIG. 3 illustrates existing vertices, prior to modification, as black-centered dots, and new vertices produced by the modification as white-centered dots.) The WCC 108 places the new vertices at locations that reflect values associated with the computer-readable code. More specifically, the WCC 108 adds a new vertex to each spoke edge (such as $e_{s1}$), and a new vertex to each outer ring edge (such as $e_{x1}$). The WCC 108 also connects the new vertices with new edges. The new edges which connect the new spoke vertices collectively define an inner ring 310. Note that each new vertex placed on a spoke edge (e.g., $e_{s1}$) has a valence of six, meaning that it is connected to six other vertices.

Figure 4:
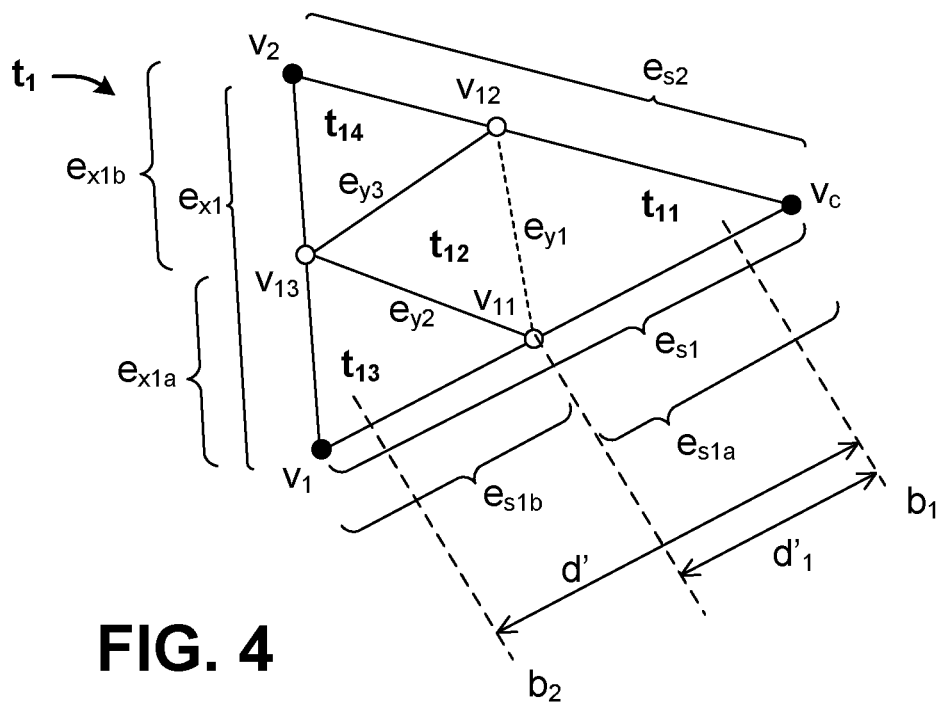

FIG. 4 describes how the WCC 108 can encode two values associated with the original triangle $t_1$. The WCC 108 adds three new vertices to triangle $t_1$, including vertex $v_{11}$ added along spoke edge $e_{s1}$, vertex $v_{12}$ added along spoke edge $e_{s2}$, and vertex $v_{13}$ added along outer ring edge $e_{x1}$. Edge $e_{s1a}$ extends from $v_c$ to $v_{11}$. Edge $e_{s1b}$ extends from $v_{11}$ to $v_1$. Edge $e_{x1a}$ extends from $v_1$ to $v_{13}$. Edge $e_{x1b}$ extends from $v_{13}$ to $v_2$. In one non-limiting case, the WCC 108 can create a first value that is equal to the ratio of the length of edge $e_{s1a}$ to the length of edge $e_{s1}$. The WCC 108 can create a second value that is equal to the ratio of the length of the edge $e_{x1a}$ to the length of the edge $e_{x1}$.

In another implementation, the WCC 108 can define a span along each edge in which it is permissible to add a new vertex, shorter than the complete span of the edge. For example, the WCC 108 can define a span d' having a starting point $b_1$ at 10% of the length d of the edge $e_{s1}$, and terminating at an ending point $b_2$ at 90% of the length of the edge $e_{s1}$. The WCC 108 can then define a value with reference to the position of the new vertex along this modified span. For example, the WCC 108 can specify a first distance $d'_1$ measured from the starting point $b_1$ on the edge $e_{s1}$ to the position of the new vertex $v_{11}$. It can then form a value as the ratio of $d'_1$ to d'. This provision is useful to prevent the WCCC 108 from placing a new vertex too close to an existing vertex, which might lead to errors in reading a value expressed by the placement of that new vertex.

Overall, the WCC 108 can choose the positions of the new vertices by successively moving around the center vertex $v_c$, e.g., by adding two new vertices for triangle $t_1$, then adding two new vertices for triangle $t_2$, then adding two new vertices for triangle $t_3$, and so on, until triangle $t_{10}$. In one implementation, the WCC 108 can pick an arbitrary triangle from which to begin, and an arbitrary direction around the center vertex $v_c$ at which to progress by adding new vertices and edges. The WCC 108 can represent each value in a prescribed number of bits, such as, without limitation, 10 bits. For a valence-ten anomalous element, the WCC 108 therefore creates 20 values, totaling 200 bits. The WCC 108 can perform the same operation with respect to one or more other anomalous elements. For example, to produce a 256 bit computer-readable code, the WCC 108 would encode two anomalous entities.

Alternatively, or in addition, the WCC 108 can encode a value based on a ratio of the areas of two triangles associated with a host triangle. For example, the WCC 108 can encode a value based on the ratio of the area of triangle $t_{11}$ to the area of the triangle $t_1$. Alternatively, or in addition, the WCC 108 can encode a value by moving an existing vertex relative to another existing vertex. For example, the WCC 108 can encode a value by slightly moving the position of the vertex $v_1$ relative to the center vertex $v_c$. Alternatively, or in addition, the WCC 108 can transform an anomalous element into a different domain, e.g., by taking the Laplacian of data expressed by the anomalous element. The WCC 108 can then add the computer-readable code to the transformed anomalous element. The above-described value-coding options are described by way of illustration, not limitation; still other value-coding strategies can be used.

As will be described below, the WCC 108 can encode one or more different information items in the computer-readable code. The information items can include: the digital watermark itself; error-checking information which can be used to verify the integrity of the digital watermark when it is subsequently read; and one or more markers. Each marker can provide guidance on the manner in which the watermark-reading component (WRC) 124 should assemble the values associated with the computer-readable code.

Different environments can use different marking strategies. In one case, the WCC 108 can add one or more markers to each anomalous element that identifies the edge at which the first value associated with that anomalous element is encoded. Alternatively, or in addition, the WCC 108 can add one or more markers to each anomalous element that identifies of the position of each value in the anomalous element relative to a preceding value (if any) and/or next (if any) value. Alternatively, or in addition, the WCC 108 can add one or more markers that identify an order in which the WRC 124 should assemble values retrieved from two or more different anomalous elements, e.g., by including a marker that indicates that the values associated with a given anomalous element under consideration correspond to a second series of values associated with a computer-readable code conveyed by a total of three anomalous elements. Alternatively, or in addition, the WCC 108 can include one or more markers that identify a link between a last value associated with a first anomalous element and a first value associated with a next anomalous element, and so on.

Figure 5:
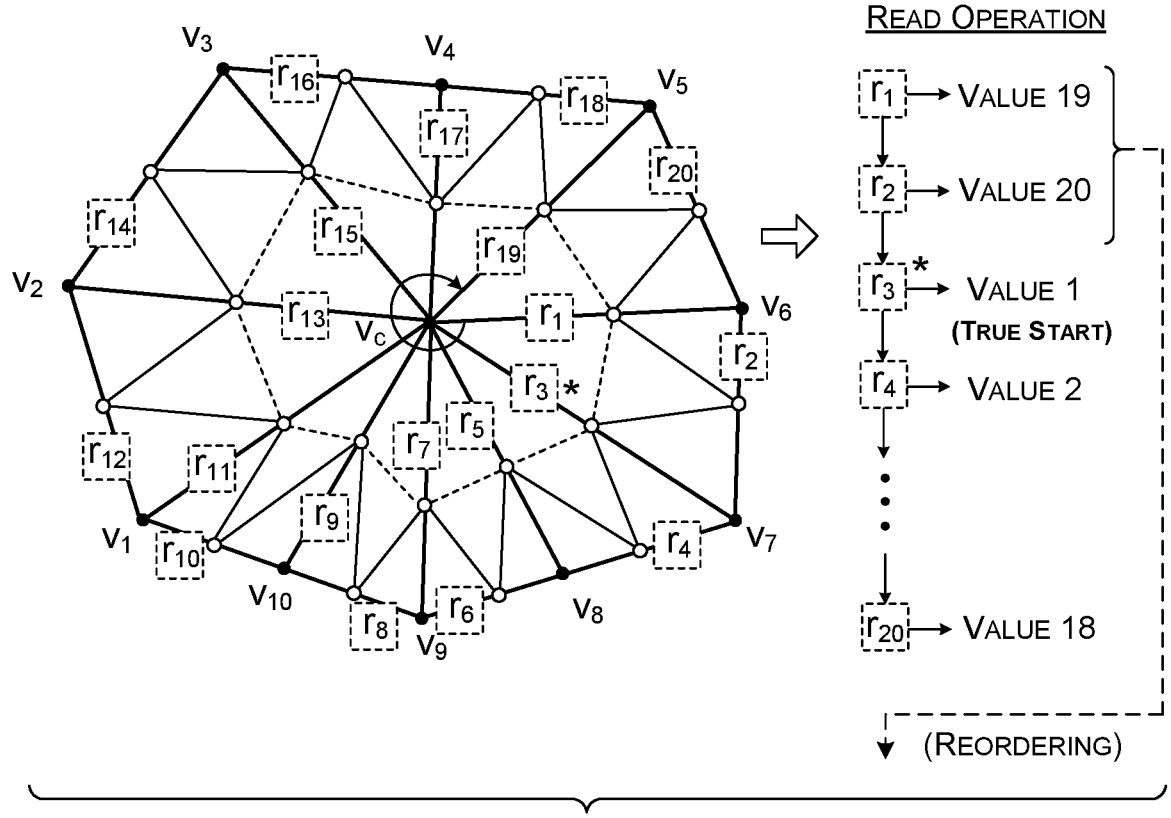
FIGS. 5 and 6 together show a non-limiting example of how the computing environment of FIG. 1 can read a digital watermark.

FIG. 5 illustrates one technique by which the WRC 124 can read values encoded by an anomalous element. The WRC 124 begins by finding the set of anomalous elements that meet a prescribed test. For example, the WRC 124 can find each anomalous element that includes a center vertex $v_c$ that has valence of ten or greater, meaning that it is connected to at least ten neighboring vertices. The WRC 124 then determines whether each immediate neighbor of the center vertex $v_c$ has a valence of six, meaning that it is connected to six other vertices. This will be the case for any anomalous element that is created by the WCC 108, as shown in FIG. 3. As a precaution, the WCC 108 can, as part of its code-creation operation, modify any element that happens to naturally meet the matching rule applied by the WRC 124 described above, but which does not store digital information. This kind of element may be referred to as a false-positive element; in many implementations, the occurrence of a false-positive element will be very rare. This will prevent the WRC 124 from attempting to read digital information from the false-positive element (which is not appropriate because it does not encode any information). For example, the WCC 108 can modify a false-positive element by changing at least one valence-six neighboring vertex to a valence-seven neighboring vertex. This change will have the effect of disqualifying the element as the kind of anomalous element that the WRC 124 is looking for.

Upon finding a matching anomalous element, the WRC 124 proceeds to read the values encoded by it. In one implementation, the WRC 124 arbitrary picks a starting edge spoke, and then successively moves around the center vertex $v_c$, reading values encoded by the edges in a clockwise or counterclockwise direction, as determined by a prior environment-specific configuration. FIG. 5 annotates the edges in the order in which the WRC 124 processes them, according to one non-limiting example. For example, assume that the WRC 124 arbitrarily starts with spoke edge $e_{s6}$. The WRC 124 reads the value encoded by spoke edge $e_{s6}$, followed by outer ring edge $e_{x6}$, followed by spoke edge $e_{s7}$, and so on. Per the non-limiting coding operation described in FIG. 4, to capture a single reading, the WRC 124 computes the lengths of two spans along a traverse, forms the ratio of these two spans (e.g., $d'_1/d'$), and then stores the ratio as an x-bit number (e.g., a 10-bit number).

In one implementation, upon reading all of the values in the specified order, the WRC 124 rearranges the values that it has read in the appropriate order. For instance, if the value collected in the third reading operation (that is, from the spoke edge $e_{s7}$) corresponds to the start of the digital information, then the WRC 124 will move the values collected in the first and second reading operations to the tail of the sequence of values that have been collected. The WRC 124 can learn that the spoke edge $e_{s7}$ corresponds to the start of the digital information based on information conveyed by one or more markers that it reads in the course of its reading operation. In another implementation, the WRC 124 can perform a preliminary scan to identify the start of the digital information (e.g., as conveyed by one or more markers), and then begin formally reading the digital information from the true start of the digital information. In the preliminary scan, the WRC 124 need not perform any computations nor store any values. Still other reading strategies are possible.

Figure 6:
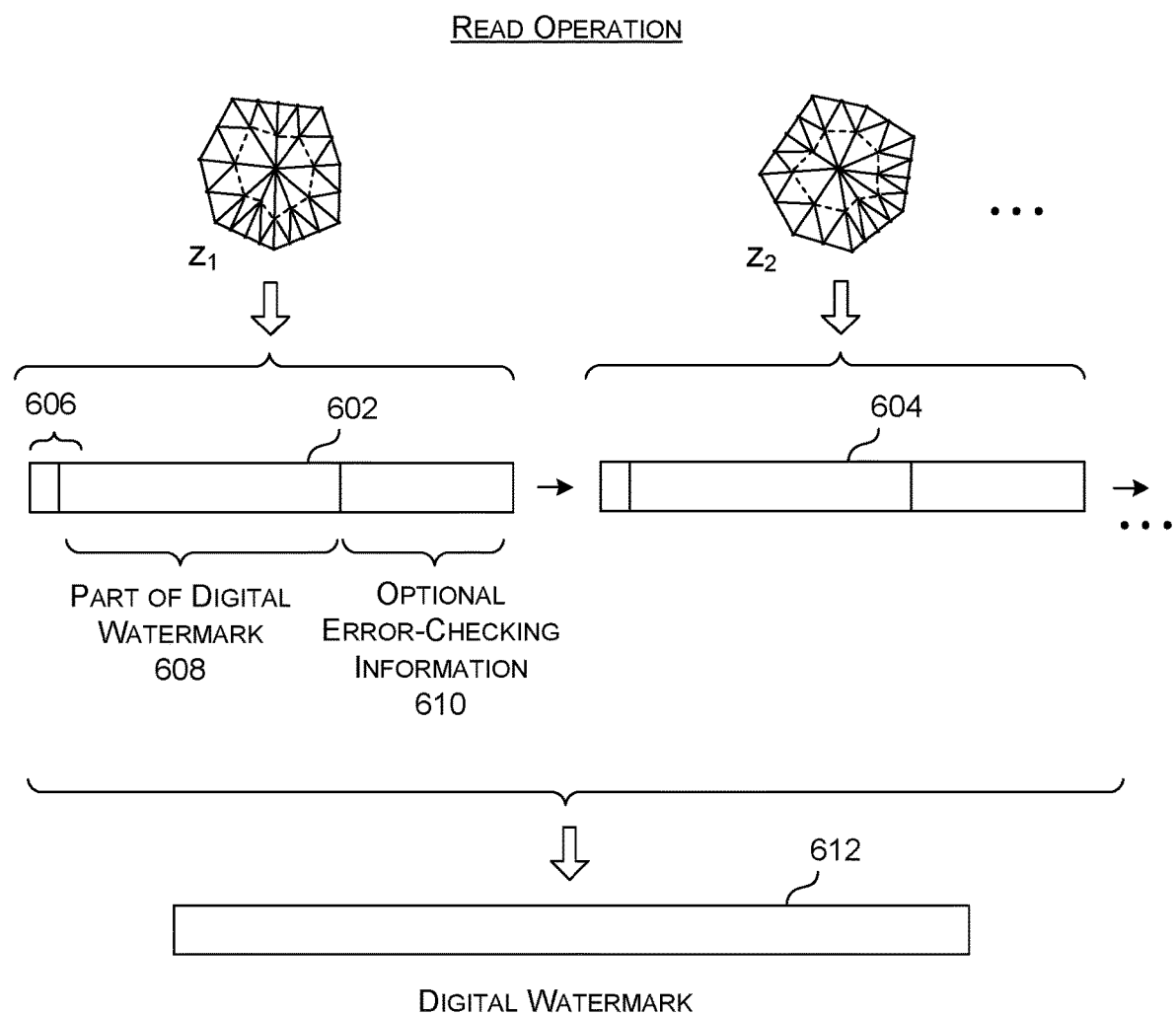

FIG. 6 shows a case in which the WRC 124 collects a first instance of digital information 602 from a first anomalous element $z_1$, and a second instance of digital information 604 from a second anomalous element $z_2$. Assume that the first instance of digital information 602 includes at least one marker 606, e.g., which serves as a header that identifies the start of the first instance of digital information 602, and which identifies the first instance of digital information 602 as the first-occurring segment of the overall computer-readable code. The first instance of digital information 602 can also include at least part of a digital watermark 608 and error-checking information 610, such as a checksum, parity bit information, a cyclic redundancy code, a cryptographic hash function, etc., or any combination thereof. The second instance of digital information 604 includes the same fields of digital information, although not specifically enumerated in FIG. 6.

The WRC 124 assembles a final digital watermark 612 based on the first instance of digital information 602 and the second instance of digital information 604. For example, the WRC 124 can concatenate the first part of the digital watermark 608 provided by the first instance of digital information 602 with the second part of the digital watermark provided by the second instance of digital information 604, assuming that the information is determined to be non-corrupted.

In another implementation, in addition to, or instead of, the use of error-checking information, the WCC 108 can store redundant copies of the digital watermark across plural anomalous elements. In this case, the WRC 124 can determine whether the set of redundant instances of the digital watermark match. If not, then the WRC 124 can conclude that one or more of the digital watermarks have been corrupted.

Figure 7:
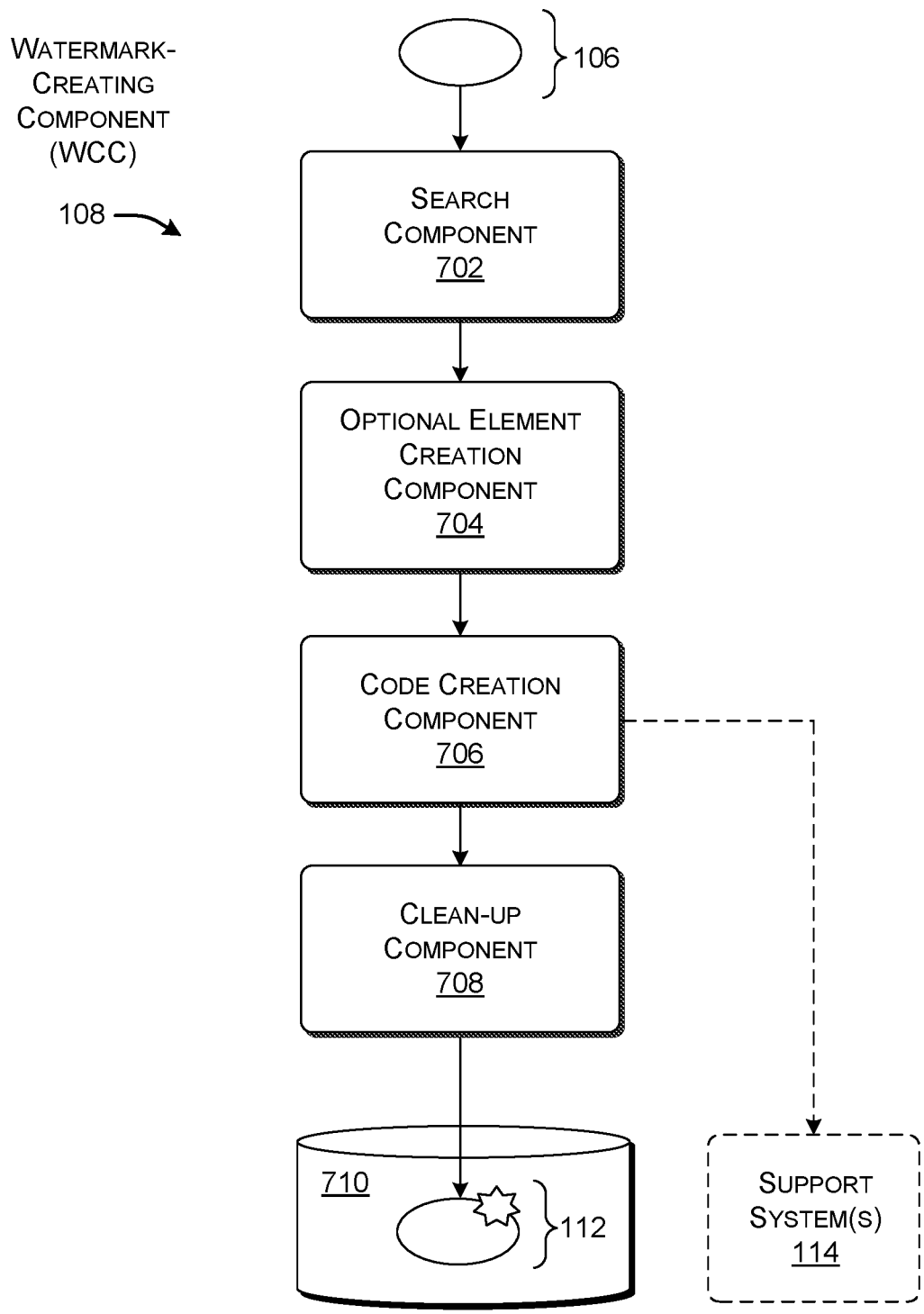
FIG. 7 shows a watermark-creating component for use in creating a digital watermark.

FIG. 7 shows one implementation of the watermark-creating component (WCC) 108. The WCC 108 includes a search component 702 for receiving the original mesh file 106. It then attempts to find one or more anomalous elements in the original mesh file 106 that meet a stored predefined rule. The rule provides the criteria by which an anomalous element is deemed to be a statistically atypical occurrence. For example, the search component 702 can find high-valence center vertices, e.g., corresponding to those vertices that are connected to ten or more neighboring vertices. In one implementation, the WCC 108 can include a configuration component that allows an end user or administrator to create a custom rule that identifies what constitutes an anomalous element.

In one implementation, the search component 702 can specifically identify a number of anomalous elements that are sufficient to store a computer-readable code of specified length. That is, if the computer-readable code is of size g, and if each anomalous element stores digital information of size h, then the search component 702 should identify p anomalous elements such that p×h>g. In some cases, the computer-readable code will not require the use of the full storage capacity of the last anomalous element. The WCC 108 can address this issue in different environment-specific ways, such as by storing dummy values in unused "slots" associated with the last anomalous element. The WCC 108 can ignore the dummy values in the reading process, or discard them if read. For instance, assume that the WCC 108 is reading a computer-readable code that it knows to be 256 bits long, per a predefined configuration. It may read all of the values associated with two anomalous elements, arrange them in the appropriate order, and then use only the first 256 bits of the extracted information, discarding the rest.

An optional element creation component 704 artificially creates one or more anomalous elements if the search component 702 fails to find a sufficient number of these elements. FIG. 3 shows one technique that the element creation component 704 can use to perform this task, e.g., by adding new spoke edges to at least one center vertex. The element creation component 704 can choose an element to be enhanced by first identifying a set of highest-valence vertices that are present in the original mesh file 106. It then picks one of these highest-valence vertices for enhancement, e.g., by modifying a chosen valence-eight vertex to a valence-ten vertex by adding two spoke edges to it.

A code creation component 706 modifies each anomalous element so that it encodes at least part of the computer-readable code. FIGS. 3 and 4 show one technique that the code creation component 706 can use to perform this task.

A clean-up component 708 can modify any false-positive element in the mesh to effectively disable it. To repeat, a false-positive element corresponds to any element in the mesh that does not store a part of the computer-readable code, but which nevertheless matches the search criteria applied by the WRC 124. For example, the clean-up component 708 can modify at least one neighboring vertex of a valence-ten center vertex so that it has a valence of seven, rather than six. This will effectively distinguish that element from the kind of anomalous element modified by the code creation component 706.

The WCC 108 can store the modified mesh file 112 thus created in a data store 710. The WCC 108 can also notify the support system(s) 114 of the existence of the modified mesh file 112, such as by forwarding the digital watermark that it has created to the support system(s) 114, along with any other environment-specific identifying information associated with the modified mesh file 112, such as its owner(s), its access rights, etc.

The WCC 108 has a number of characteristics which contribute to its usefulness. According to one technical feature, the WCC 108 encodes the digital watermark into the mesh itself, e.g., by adding new vertices to the mesh, rather than adding supplemental information apart from the mesh that is appended to the mesh. By virtue of this characteristic, the modified mesh file 112 can be successfully read by different applications having different native file formats (associated with different storage and access protocols). That is, insofar as each application does not corrupt the positions of the vertices in the mesh, it should not corrupt the digital watermark encoded thereby.

According to another technical feature, the WCC 108 can modify an anomalous element in such a manner that does not change the visual appearance of the mesh when it is rendered. For example, in the technique shown in FIG. 3, the WCC 108 adds new triangles to the mesh, but these new triangles lie flush within the surfaces of existing triangles. Hence, the new triangles do not change the contour of the three-dimensional object described by the mesh. In those implementations in which the WCC 108 changes the positions of existing vertices, the WCC does slightly modify the shape of the mesh, but not to a significant enough degree to be readily noticed by a viewer.

According to another technical feature, the WCC 108 encodes the digital watermark in a manner that is resilient to various kinds of changes made to the modified mesh file, including uniform scaling/resizing changes, affine transformation changes, rotation changes, etc.

Figure 8:
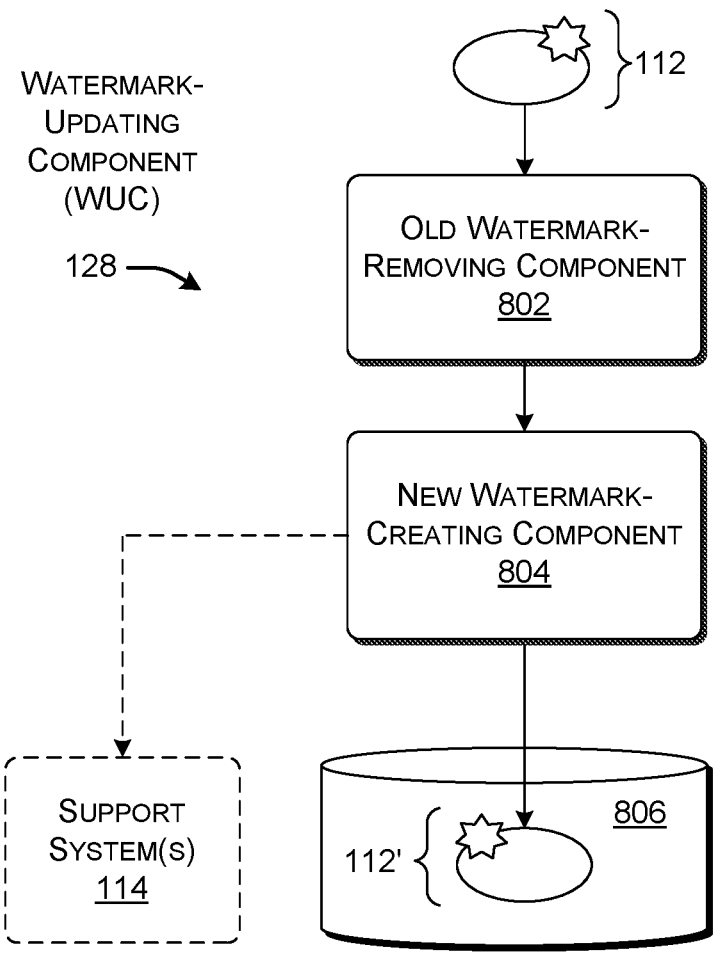
FIG. 8 shows a watermark-updating component for use in updating a previously created digital watermark.

FIG. 8 shows one implementation of the watermark-updating component (WUC) 128. The WUC 128 can update an existing digital watermark to reflect a change that a consumer has made to the mesh file itself.

The WUC 128 optionally includes an old watermark-removing component 802 for removing an existing digital watermark associated with one or more anomalous elements in a previously-modified mesh file 112. For example, the WUC 128 can remove the new vertices added to the anomalous element(s), corresponding to the white-centered dots shown in FIG. 3. A new watermark-creating component 804 re-encodes the anomalous element(s) with a new computer-readable code in the same manner described in FIG. 3. In another implementation, the WUC 128 omits the old watermark-removing component 802. In that case, the new watermark-creating component 804 adjusts the positions of the existing new vertices so that they express the new computer-readable code. In another case, the WUC 128 can add a new computer-readable code without removing the old computer-readable code(s). Each computer-readable code can include version information to distinguish it from other computer-readable code(s) in the same mesh file. In any case, the new watermark-creating component 804 stores a new modified mesh file 112' in a data store 806. It may also update a shared ledger in the support system(s) 114 to reflect changes that have been made to the mesh file.

Figure 9:
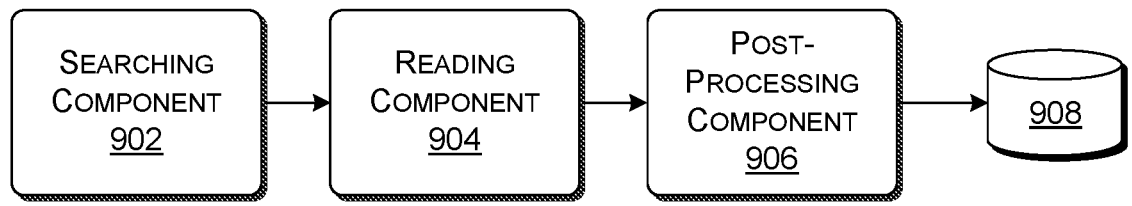
FIG. 9 shows a watermark-reading component for use in reading a digital watermark from a modified mesh file.

FIG. 9 shows one implementation of the watermark-reading component (WRC) 124. The WRC 124 includes a searching component 902 for searching for each anomalous element that matches a predetermined rule. For example, the searching component 902 can look for each at-least-valence-ten center vertex having neighboring vertices, each of valence-six. (Note that the matching rule applied the WRC 124 is therefore narrower than the matching rule applied by the WCC 108 because it additionally examines the valence of the vertices which neighbor the center vertex $v_c$.) A reading component 904 reads digital information from the values encoded by each anomalous element identified by the searching component 902, e.g., using the technique shown in FIG. 5. A post-processing component 906 can performing any kind of error-checking on the digital information extracted from the anomalous elements. The post-processing component 906 can also assemble different parts of the extracted digital information, e.g., as guided by one or more markers provided in the digital information. The post-processing component 906 can store its processed digital information in a data store 908.

B. Illustrative Processes

Figure 11:
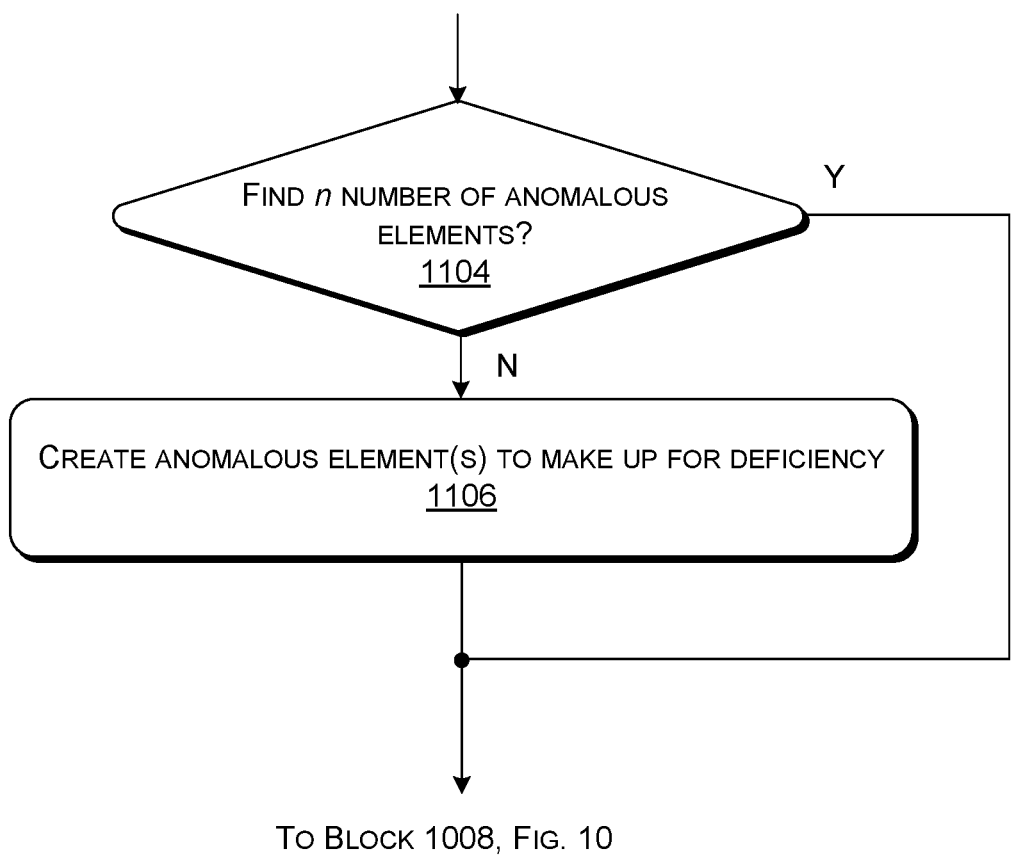
FIG. 11 is a flowchart that shows one illustrative process for searching for an anomalous element, which corresponds to a step within the flowchart of FIG. 10.

FIGS. 10-12 show processes that explain the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 10 is a flowchart that shows one illustrative process 1002 for creating a digital watermark. In block 1004, the WCC 108 provide a file having a data structure that expresses an original mesh, the original mesh describing a three-dimensional object, the original mesh having: a plurality of vertices that have respective locations in the original mesh; a plurality of edges that connect the vertices together; and a plurality of polygonal shapes defined by the vertices and the edges. In block 1006, the WCC 108 searches the data structure for at least one anomalous element of the original mesh that qualifies as a statistically atypical occurrence within the original mesh, based on a predetermined rule that defines what constitutes a statistically atypical occurrence. In block 1008, the WCC 108 modifies one or more anomalous elements that are identified so that the one or more anomalous elements collectively express a computer-readable code including a digital watermark, the modifying operation producing a modified mesh file 112. In block 1010, the WCC 108 stores the modified mesh file 112 on a computer-readable medium. The computer-readable code is extractable by any of a set of consuming applications that use different respective native file formats.

FIG. 11 is a flowchart that shows one illustrative process 1102 for searching for an anomalous element, corresponding to the operation associated with the block 1006 of FIG. 10. In block 1104, the WCC 108 determines whether the original mesh already includes a required number of anomalous elements to express the computer-readable code. In block 1106, if the answer to block 1104 is negative, the WCC 108 creates one or more anomalous elements, e.g., by adding new edges to the original mesh.

FIG. 12 is a flowchart that shows one illustrative process 1202 for reading a digital watermark. In block 1204, the WRC 124 receives a file having a data structure that expresses a modified mesh, the modified mesh describing a three-dimensional object, the modified mesh having: a plurality of vertices that have respective locations in the original mesh; a plurality of edges that connect the vertices together; a plurality of polygonal shapes defined by the vertices and the edges; and a computer-readable code that includes a digital watermark. In block 1206, the WRC 124 searches the data structure for at least one anomalous element of the modified mesh that qualifies as a statistically atypical occurrence within the modified mesh, based on a predetermined rule that defines what constitutes a statistically atypical occurrence. In block 1208, the WRC 124 reads the machine-readable code from the anomalous element(s) that are identified by the searching operation. In block 1210, the WRC 124 optionally verifies the integrity of the digital watermark that is read based on error-checking information contained in the computer-readable code. In block 1212, the WRC 124 processes the digital watermark in the computer-readable code. Block 1212 can include performing any of a verification operation, an authentication operation, an asset-tracking operation, etc.

C. Representative Computing Functionality

Figure 13:
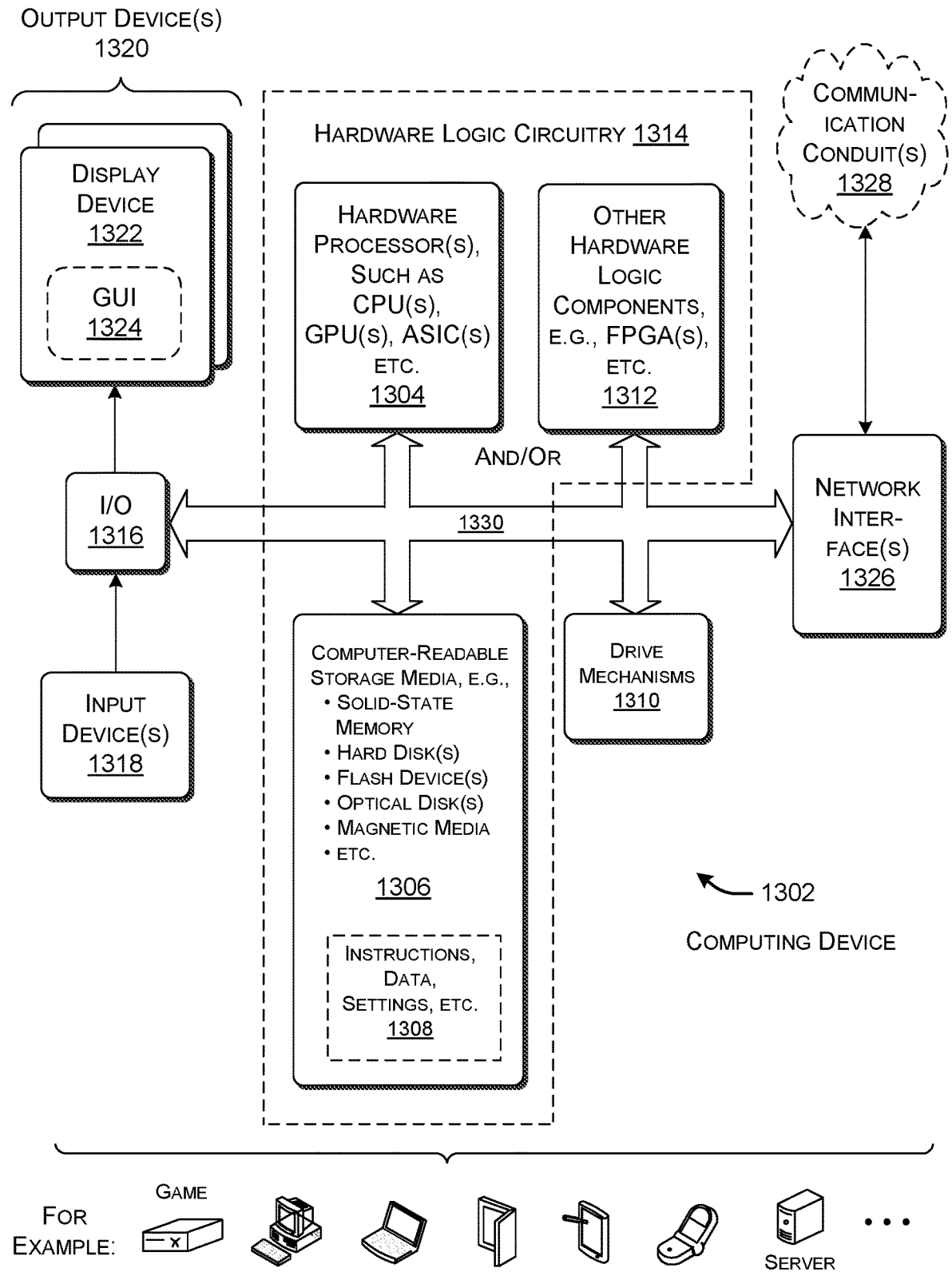
FIG. 13 shows an illustrative type of computing device that can be used to implement any aspect of the features shown in the foregoing drawings.

FIG. 13 shows a computing device 1302 that can be used to implement any aspect of the mechanisms set forth in the above-described figures. For instance, with reference to FIG. 1, the type of computing device 1302 shown in FIG. 13 can be used to implement any of the watermark-processing devices (104, 118). In all cases, the computing device 1302 represents a physical and tangible processing mechanism.

The computing device 1302 can include one or more hardware processors 1304. The hardware processor(s) 1304 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processing unit.

The computing device 1302 can also include computer-readable storage media 1306, corresponding to one or more computer-readable media hardware units. The computer-readable storage media 1306 retains any kind of information 1308, such as machine-readable instructions, settings, data, etc. Without limitation, for instance, the computer-readable storage media 1306 may include one or more solid-state devices, one or more magnetic hard disks, one or more optical disks, magnetic tape, and so on. Any instance of the computer-readable storage media 1306 can use any technology for storing and retrieving information. Further, any instance of the computer-readable storage media 1306 may represent a fixed or removable component of the computing device 1302. Further, any instance of the computer-readable storage media 1306 may provide volatile or non-volatile retention of information.

The computing device 1302 can utilize any instance of the computer-readable storage media 1306 in different ways. For example, any instance of the computer-readable storage media 1306 may represent a hardware memory unit (such as Random Access Memory (RAM)) for storing transient information during execution of a program by the computing device 1302, and/or a hardware storage unit (such as a hard disk) for retaining/archiving information on a more permanent basis. In the latter case, the computing device 1302 may also include one or more drive mechanisms 1310 (such as a hard drive mechanism) for storing and retrieving information from an instance of the computer-readable storage media 1306.

The computing device 1302 may perform any of the functions described above when the hardware processor(s) 1304 carry out computer-readable instructions stored in any instance of the computer-readable storage media 1306. For instance, the computing device 1302 may carry out computer-readable instructions to perform each block of the processes described in Section B.

Alternatively, or in addition, the computing device 1302 may rely on one or more other hardware logic components 1312 to perform operations using a task-specific collection of logic gates. For instance, the hardware logic component(s) 1312 may include a fixed configuration of hardware logic gates, e.g., that are created and set at the time of manufacture, and thereafter unalterable. Alternatively, or in addition, the other hardware logic component(s) 1312 may include a collection of programmable hardware logic gates that can be set to perform different application-specific tasks. The latter category of devices includes, but is not limited to, Programmable Array Logic Devices (PALs), Generic Array Logic Devices (GALs), Complex Programmable Logic Devices (CPLDs), Field-Programmable Gate Arrays (FPGAs), etc.

FIG. 13 generally indicates that hardware logic circuitry 1314 corresponds to any combination of the hardware processor(s) 1304, the computer-readable storage media 1306, and/or the other hardware logic component(s) 1312. That is, the computing device 1302 can employ any combination of the hardware processor(s) 1304 that execute machine-readable instructions provided in the computer-readable storage media 1306, and/or one or more other hardware logic component(s) 1312 that perform operations using a fixed and/or programmable collection of hardware logic gates.

In some cases (e.g., in the case in which the computing device 1302 represents a user computing device), the computing device 1302 also includes an input/output interface 1316 for receiving various inputs (via input devices 1318), and for providing various outputs (via output devices 1320). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1322 and an associated graphical user interface presentation (GUI) 1324. The display device 1322 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1302 can also include one or more network interfaces 1326 for exchanging data with other devices via one or more communication conduits 1328. One or more communication buses 1330 communicatively couple the above-described components together.

The communication conduit(s) 1328 can be implemented in any manner, e.g., by a local area computer network, a wide area computer network (e.g., the Internet), point-to-point connections, etc., or any combination thereof. The communication conduit(s) 1328 can include any combination of hardwired links, wireless links, routers, gateway functionality, name servers, etc., governed by any protocol or combination of protocols.

FIG. 13 shows the computing device 1302 as being composed of a discrete collection of separate units. In some cases, the collection of units may correspond to discrete hardware units provided in a computing device chassis having any form factor. FIG. 13 shows illustrative form factors in its bottom portion. In other cases, the computing device 1302 can include a hardware logic component that integrates the functions of two or more of the units shown in FIG. 1. For instance, the computing device 1302 can include a system on a chip (SoC or SOC), corresponding to an integrated circuit that combines the functions of two or more of the units shown in FIG. 13.

The following summary provides a non-exhaustive set of illustrative aspects of the technology set forth herein.

According to a first aspect, one or more computing devices are described for creating a digital watermark. The device(s) include hardware logic circuitry, the hardware logic circuitry corresponding to: (a) one or more hardware processors that perform operations by executing machine-readable instructions stored in a memory; and/or (b) one or more other hardware logic components that perform operations using a task-specific collection of logic gates. The operations include: providing a file having a data structure that expresses an original mesh, the original mesh describing a three-dimensional object, the original mesh having: a plurality of vertices that have respective locations in the original mesh; a plurality of edges that connect the vertices together; and a plurality of polygonal shapes defined by the vertices and the edges. The operations also include: searching the data structure for at least one anomalous element of the original mesh that qualifies as a statistically atypical occurrence within the original mesh, based on a predetermined rule that defines what constitutes a statistically atypical occurrence; modifying one or more anomalous elements that are identified so that the one or more anomalous elements collectively express a computer-readable code including a digital watermark, the modifying producing a modified mesh file; and storing the modified mesh file on a computer-readable medium. The computer-readable code is extractable by any of a set of consuming applications that use different respective native file formats.

According to a second aspect, the rule defines an anomalous element as an element that includes a center vertex that is connected to at least a prescribed number n of other vertices.

According to a third aspect, each vertex in the original mesh is, on average, connected to a given number z of other vertices, and wherein the prescribed number n is greater than the given number z.

According to a fourth aspect, the searching operation includes creating at least one anomalous element if the original mesh does not already include a required number of anomalous elements to express the computer-readable code.

According to a fifth aspect, the creating operation (referenced by the fourth aspect) includes adding one or more new edges that connect to at least one identified center vertex in the original mesh.

According to a sixth aspect, the modifying operation includes subdividing each of the one or more anomalous elements, without changing a contour of a surface defined by each of the one or more anomalous elements.

According to a seventh aspect, the modifying operation includes adding new vertices to each of the one or more anomalous elements and/or adjusting existing vertices associated with each of the one or more anomalous elements.

According to an eighth aspect, the operation of adding new vertices (referenced by the seventh aspect) includes adding a new vertex on each existing edge associated with each anomalous element. A location at which each new vertex is placed on each existing edge defines a value associated with the computer-readable code.

According to a ninth aspect, the computer-readable code includes at least one marker code which conveys information regarding an order in which values encoded by the one or more anomalous elements are to be assembled to form the computer-readable code.

According to a tenth aspect, the computer-readable code includes error-checking information for use in verifying an integrity of the digital watermark when it is read.

According to an eleventh aspect, the operations further include altering one or more false-positive elements in the modified mesh file so that none of the one or more false-positive elements will be interpreted as an anomalous element in a subsequent read operation. A false-positive element corresponds to an element that satisfies a matching rule associated with the read operation, but which encodes no part of the computer-readable code.

According to a twelfth aspect, a method is described for reading a digital watermark. The method includes receiving a file having a data structure that expresses a modified mesh. The modified mesh describes a three-dimensional object, and has: a plurality of vertices that have respective locations in the original mesh; a plurality of edges that connect the vertices together; a plurality of polygonal shapes defined by the vertices and the edges; and a computer-readable code that includes a digital watermark. The method further includes: searching the data structure for at least one anomalous element of the modified mesh that qualifies as a statistically atypical occurrence within the modified mesh, based on a predetermined rule that defines what constitutes a statistically atypical occurrence; reading the machine-readable code from the at least one anomalous element that is identified by the searching; and processing the digital watermark in the computer-readable code. The receiving, searching, reading, and processing operations are performed by one or more computing devices.

According to a thirteenth aspect, dependent on the twelfth aspect, the rule defines an anomalous element as an element that includes a center vertex that is connected to at least a prescribed number n of other vertices.

According to a fourteenth aspect, dependent on the twelfth aspect, the rule defines an anomalous element as an element that includes: a center vertex that is connected to at least a prescribed number n of other vertices, wherein each immediate neighboring vertex to the center vertex is connected to another prescribed number m of other vertices.

According to a fifteenth aspect, dependent on the twelfth aspect, each anomalous element is associated with a center vertex. Further, the reading includes reading values encoded in each anomalous element by investigating edges arrayed around the center vertex in a predefined order.

According to a sixteenth aspect, the method of the twelfth aspect further includes verifying an integrity of the digital watermark that is read based on error-checking information contained in the computer-readable code.

According to a seventeenth aspect, the processing operation of the twelfth aspect includes comparing the digital watermark that is read to a known valid digital watermark.

According to an eighteenth aspect, the processing operation of the twelfth aspect includes notifying a tracking system that a user has accessed the file providing the modified mesh.

According to a nineteenth aspect, the processing operation of the twelfth aspect includes: modifying the computer-readable code expressed by the modified mesh, to provide an updated mesh file that expresses an updated digital watermark; and storing data that identifies the updated mesh file in a shared ledger.

According to a twentieth aspect, a computer-readable storage medium is described for storing computer-readable instructions, the computer-readable instructions, when executed by one or more hardware processors, perform a method. The method includes providing a file having a data structure that expresses an original mesh that describes a three-dimensional object, the original mesh having: a plurality of vertices that have respective locations in the original mesh; a plurality of edges that connect the vertices together; and a plurality of polygonal shapes defined by the vertices and the edges. The method further includes: searching the data structure for at least one anomalous element in the original mesh, each of which includes a center vertex that is connected to more than a prescribed number n of other vertices; modifying one or more anomalous elements that are identified so that the one or more anomalous elements collectively express a computer-readable code including a digital watermark, to produce a modified mesh file; and storing the modified mesh file. The modifying operation involves subdividing each of the one or more anomalous elements.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for creating a digital watermark, comprising:
hardware logic circuitry, the hardware logic circuitry corresponding to: (a) one or more hardware processors that perform operations by executing machine-readable instructions stored in a memory; or (b) one or more other hardware logic components that perform the operations using a task-specific collection of logic gates; or (a) and (b), the operations including:
providing a file having a data structure that expresses an original mesh, the original mesh describing a three-dimensional object, the original mesh having:
a plurality of vertices that have respective locations in the original mesh;
a plurality of edges that connect the vertices together; and
a plurality of polygonal shapes defined by the vertices and the edges;
searching the data structure for at least one anomalous element of the original mesh that qualifies as a statistically atypical occurrence within the original mesh, based on a predetermined rule that defines what constitutes a statistically atypical occurrence;
subdividing one or more anomalous elements that are identified to produce subdivisions that are chosen to collectively encode values of a computer-readable code including the digital watermark, said subdividing producing a modified mesh file and comprising, for each anomalous element of the one or more anomalous elements, adding a new vertex on each existing edge, for a plurality of existing edges, wherein the adding comprises choosing a location at which the new vertex is placed on the each existing edge, and wherein the location defines a particular value of the values of the computer-readable code; and
storing the modified mesh file on a computer-readable medium, the computer-readable code being embedded in said one or more anomalous elements, and being extractable from said one or more anomalous elements by reading the values that are expressed by the subdivisions, said reading the values comprising, for the each anomalous element of the one or more anomalous elements, successively reading edges that include new vertices that are arrayed around a center vertex, starting with a chosen edge.

2. The one or more computing devices of claim 1, wherein the rule defines an anomalous element as an element that includes a particular center vertex that is connected to at least a prescribed number of other vertices.

3. The one or more computing devices of claim 2, wherein each vertex in the original mesh is, on average, connected to a given number of other vertices, and wherein the prescribed number is greater than the given number.

4. The one or more computing devices of claim 1, wherein the original mesh does not already include a required number of anomalous elements to express the computer-readable code, and wherein said searching includes creating at least one anomalous element.

5. The one or more computing devices of claim 4, wherein said creating at least one anomalous element comprises adding one or more new edges that connect to at least one identified center vertex in the original mesh.

6. The one or more computing devices of claim 1, wherein said subdividing does not change a contour of a surface defined by each of said one or more anomalous elements.

7. The one or more computing devices of claim 1, wherein the computer-readable code includes at least one marker code which conveys information regarding an order in which values encoded by said one or more anomalous elements are to be assembled to form the computer-readable code.

8. The one or more computing devices of claim 1, wherein the computer-readable code includes error-checking information for use in verifying an integrity of the digital watermark when it is read.

9. The one or more computing devices of claim 1,
wherein the operations further comprise altering one or more false-positive elements in the modified mesh file so that none of said one or more false-positive elements will be interpreted as an anomalous element in a subsequent read operation,
a false-positive element corresponding to an element that satisfies a matching rule associated with the read operation, but which encodes no part of the computer-readable code.

10. A method for reading a digital watermark, comprising:
receiving a file having a data structure that expresses a modified mesh, the modified mesh describing a three-dimensional object, the modified mesh having:
a plurality of vertices that have respective locations in an original mesh;
a plurality of edges that connect the vertices together;
a plurality of polygonal shapes defined by the vertices and the edges; and
a computer-readable code that includes the digital watermark;
searching the data structure for at least one anomalous element of the modified mesh that qualifies as a statistically atypical occurrence within the modified mesh, based on a predetermined rule that defines what constitutes a statistically atypical occurrence, each of said at least one anomalous element having been subdivided to produce subdivisions that are chosen to collectively encode values of the computer-readable code;
reading the computer-readable code from said at least one anomalous element that is identified by said searching by reading the values that are expressed by the subdivisions, the computer-readable code being embedded in said at least one anomalous element, said subdivisions having been created, for each anomalous element of said at least one anomalous element, by adding a new vertex on each existing edge, for a plurality of existing edges, wherein the each existing edge, and wherein the location defines a particular value of the values of the computer-readable code; and processing the digital watermark in the computer-readable code, said receiving, said searching, said reading the computer-readable code, and said processing being performed by one or more computing devices, wherein the each anomalous element of said at least one anomalous element is associated with a center vertex, and wherein said reading the values comprises, for the each anomalous element of said at least one anomalous element, successively reading edges that include new vertices that are arrayed around the center vertex, starting with a chosen edge.

11. The method of claim 10, wherein the rule defines an anomalous element as an element that includes a particular center vertex that is connected to at least a prescribed number of other vertices.

12. The method of claim 10, wherein the rule defines an anomalous element as an element that includes: a particular center vertex that is connected to at least a prescribed number of other vertices, wherein each immediate neighboring vertex to the particular center vertex is connected to another prescribed number of other vertices.

13. The method of claim 10, wherein said reading the values comprises reading values encoded in the edges that include the new vertices in a predefined order.

14. The method of claim 10, further comprising verifying an integrity of the digital watermark that is read based on error-checking information contained in the computer-readable code.

15. The method of claim 10, wherein said processing includes comparing the digital watermark that is read to a known valid digital watermark.

16. The method of claim 10, wherein said processing includes notifying a tracking system that a user has accessed the file providing the modified mesh.

17. The method of claim 10, wherein said processing includes:

modifying the computer-readable code expressed by the modified mesh, to provide an updated mesh file that expresses an updated digital watermark; and storing data that identifies the updated mesh file in a shared ledger.

18. A computer-readable storage medium for storing computer-readable instructions, the computer-readable instructions, when executed by one or more hardware processors, performing operations that comprise:

providing a file having a data structure that expresses an original mesh that describes a three-dimensional object, the original mesh having:

a plurality of vertices that have respective locations in the original mesh;

a plurality of edges that connect the vertices together; and a plurality of polygonal shapes defined by the vertices and the edges;

searching the data structure for at least one anomalous element in the original mesh, each of which includes a center vertex that is connected to more than a prescribed number of other vertices;

subdividing one or more anomalous elements that are identified so that said one or more anomalous elements collectively express a computer-readable code including a digital watermark, said subdividing producing a modified mesh file, said subdividing comprising subdividing each of said one or more anomalous elements to produce subdivisions that are chosen to collectively encode values of the computer-readable code and further comprising for each anomalous element of the one or more anomalous elements, adding a new vertex on each existing edge, for a plurality of existing edges, wherein the adding comprises choosing a location at which the new vertex is placed on the each existing edge, and wherein the location defines a particular value of the values of the computer-readable code; and storing the modified mesh file, the computer-readable code being embedded in said one or more anomalous elements, and being extractable from said one or more anomalous elements by reading the values that are expressed by the subdivisions, said reading the values comprising, for the each anomalous element of the one or more anomalous elements, successively reading edges that include new vertices that are arrayed around the center vertex, starting with a chosen edge.

* * * * *